US 6,617,564 B2

(12) United States Patent
Ockerse et al.

(10) Patent No.: US 6,617,564 B2
(45) Date of Patent: Sep. 9, 2003

(54) MOISTURE SENSOR UTILIZING STEREO IMAGING WITH AN IMAGE SENSOR

(75) Inventors: Harold C. Ockerse, Holland, MI (US); John K. Roberts, East Grand Rapids, MI (US)

(73) Assignee: Gentex Corporation, Zeeland, MI (US)

( * ) Notice: Subject to any disclaimer, the term of this patent is extended or adjusted under 35 U.S.C. 154(b) by 0 days.

(21) Appl. No.: 09/970,962

(22) Filed: Oct. 4, 2001

(65) Prior Publication Data

US 2003/0066948 A1 Apr. 10, 2003

(51) Int. Cl.[7] .................................................. H01L 27/00
(52) U.S. Cl. .............................. 250/208.1; 250/227.25; 318/DIG. 2
(58) Field of Search ......................... 250/208.1, 227.25; 340/602, 901, 903; 318/DIG. 2, 444, 483

(56) References Cited

U.S. PATENT DOCUMENTS

| 4,355,271 | A | 10/1982 | Noack |
| 4,620,141 | A | 10/1986 | McCumber et al. |
| 4,652,745 | A | 3/1987 | Zanardelli |
| 4,798,956 | A | 1/1989 | Hochstein |
| 4,859,867 | A | 8/1989 | Larson et al. |
| 4,867,561 | A | 9/1989 | Fujii et al. |
| 4,871,917 | A | 10/1989 | O'Farrell et al. |
| 4,916,307 | A | 4/1990 | Nishibe et al. |
| 4,916,374 | A | 4/1990 | Schierbeek et al. |
| 4,930,742 | A | 6/1990 | Schofield et al. |
| 4,956,591 | A | 9/1990 | Schierbeek et al. |
| 4,960,996 | A | 10/1990 | Hochstein |
| 4,973,844 | A | 11/1990 | O'Farrell et al. |
| 4,987,354 | A | 1/1991 | Steinmann |
| 5,276,389 | A | 1/1994 | Levers |
| 5,306,992 | A | 4/1994 | Dröge |
| 5,313,072 | A | 5/1994 | Vachss |
| 5,336,980 | A | 8/1994 | Levers |
| 5,386,111 | A | 1/1995 | Zimmerman |
| 5,483,346 | A | 1/1996 | Butzer |

(List continued on next page.)

FOREIGN PATENT DOCUMENTS

| DE | 2946561 | 5/1981 |
| DE | 4424454 | 1/1996 |
| DE | 19803694 | 1/1998 |
| EP | 0479169 | 4/1992 |
| EP | 0832798 | 9/1997 |
| GB | 2056059 | 3/1981 |
| JP | 9-126998 | 5/1997 |
| WO | 9427262 | 11/1994 |
| WO | 9501561 | 1/1995 |
| WO | 9923828 | 5/1999 |
| WO | 9947396 | 9/1999 |
| WO | 0053465 | 9/2000 |
| WO | 0177763 | 10/2001 |

OTHER PUBLICATIONS

Patent Abstract of Japanese Publication No. 59199347, published Nov. 12, 1984, entitled Wiper Controller for Vehicle.

Primary Examiner—Stephone B. Allen
(74) Attorney, Agent, or Firm—Price, Heneveld, Cooper, DeWitt & Litton

(57) ABSTRACT

A moisture sensing system of the present invention includes first and second sensor arrays, at least one optical system operative to image the same portion of the surface onto both of the sensor arrays, and a processing system in communication with the sensor arrays and operative to analyze images from the sensor arrays to detect moisture. The sensor arrays may be two-dimensional sensor arrays that are separate or different portions of the same sensor array. This system may be used to control the windshield wipers of a vehicle. The processing system may be configured to subtract an image obtained from the first sensor array from an image obtained from the second sensor array to distinguish between near field and far field objects.

26 Claims, 7 Drawing Sheets

U.S. PATENT DOCUMENTS

| | | |
|---|---|---|
| 5,498,866 A | 3/1996 | Bendicks et al. |
| 5,581,240 A | 12/1996 | Egger |
| 5,598,146 A | 1/1997 | Schröder |
| 5,659,294 A | 8/1997 | Schröder |
| 5,661,303 A | 8/1997 | Teder |
| 5,663,542 A | 9/1997 | Kohr et al. |
| 5,703,568 A | 12/1997 | Hegyi |
| RE35,762 E | 4/1998 | Zimmerman |
| 5,796,094 A | 8/1998 | Schofield et al. |
| 5,796,106 A | 8/1998 | Noack |
| 5,811,793 A | 9/1998 | Pientka |
| 5,818,600 A | 10/1998 | Bendicks et al. |
| 5,821,863 A | 10/1998 | Schroder et al. |
| 5,872,437 A | 2/1999 | Pientka et al. |
| 5,923,027 A | 7/1999 | Stam et al. |
| 6,008,486 A | 12/1999 | Stam et al. |
| 6,097,024 A | 8/2000 | Stam et al. |
| 6,118,383 A | 9/2000 | Hegyi |
| 6,207,967 B1 | 3/2001 | Hochstein |
| 6,313,454 B1 | 11/2001 | Bos et al. |
| 6,320,176 B1 | 11/2001 | Schofield et al. |
| 6,323,477 B1 | 11/2001 | Blasing et al. |
| 6,326,613 B1 | 12/2001 | Heslin et al. ............... 250/239 |
| 6,353,392 B1 | 3/2002 | Schofield et al. ........... 340/602 |
| 6,396,397 B1 * | 5/2002 | Bos et al. .................... 340/461 |
| 2001/0042822 A1 * | 11/2001 | Hochstein .............. 250/227.25 |

* cited by examiner

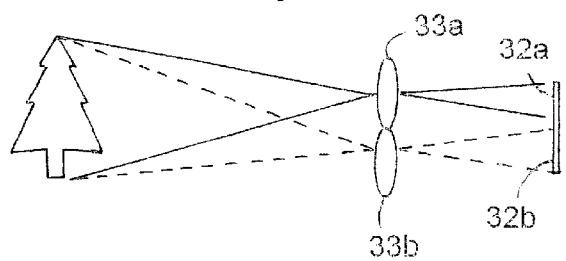
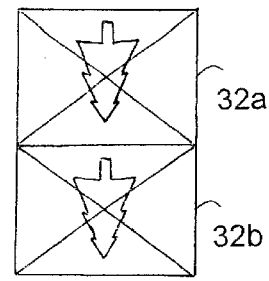
FIG. 3A
FIG. 3B
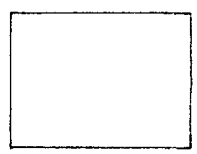
FIG. 3C
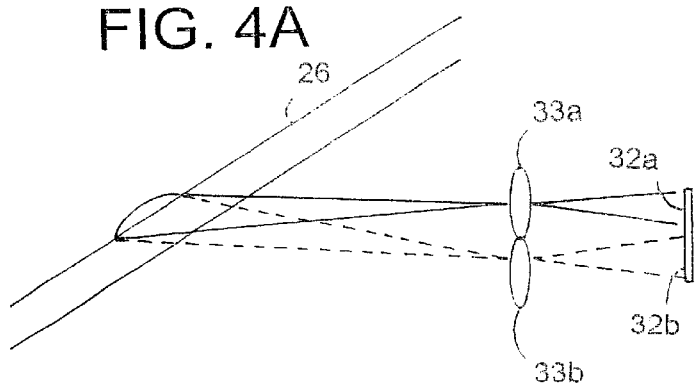
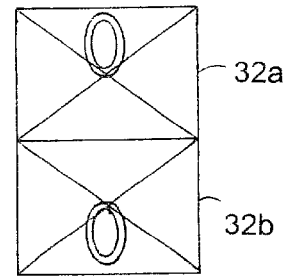
FIG. 4A
FIG. 4B
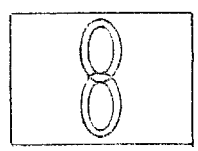
FIG. 4C

MOISTURE SENSOR UTILIZING STEREO IMAGING WITH AN IMAGE SENSOR

BACKGROUND OF THE INVENTION

The present invention relates to a system for automatically detecting the presence of moisture on a surface, such as the surface of a windshield of a vehicle for an automobile, in order to automatically actuate the vehicle's windshield wipers and/or defroster or defogging system.

In conventional windshield wiper systems, the windshield wipers are actuated based on the elapsed time between wipes rather than the moisture level on the exterior of the windshield. During conditions of relatively consistent rainfall, for example, the time interval can be adjusted to correspond to the amount of time in which the rain accumulates to the point of the desired visibility level. Unfortunately, the rate of rainfall may vary dramatically over a given period of time. Additionally, traffic conditions may also cause varying amounts of rain to fall on the windshields, such as when a truck passes by. As a result, during such conditions, the driver must frequently adjust the wiper time interval, which can be cumbersome.

Various systems are known which automatically control the interval between wipes of the windshield wipers based upon moisture on the vehicle windshield. In some known systems, various coatings are applied to the vehicle windshield. Electrical measurement of those coatings is used to provide an indication of the moisture content on the windshield. Unfortunately, such methods require relatively expensive processes, which makes such systems commercially non-viable. Other systems for automatically sensing the moisture content on a vehicle windshield are also known. For example, optical systems are known which measure the difference of reflected light of a dry windshield versus a wet windshield. Unfortunately, such optical systems are susceptible to interference from external light sources and thus provide inadequate performance. Other known systems must be adhered to the windshield, which complicates the windshield replacement. As a result of such complications, moisture sensors are rarely found on vehicles.

Another system for automatically detecting the moisture content on a windshield is disclosed in Japanese Laid Open Patent Application No. Hei(1995)-286130, which describes the use of a charge coupled device (CCD) image sensor to image a portion of the vehicle windshield in order to detect raindrops. The system described therein computes the sum of the differences between each pixel and the average of all pixels. Unfortunately, headlamps of oncoming vehicles will create a bright spot in the image, which would be difficult to completely blur and likely be interpreted as rain. Moreover, in order for such a system to work effectively, distant objects within the imaged scene must be completely blurred. Otherwise, there will be dark and light regions in the imaged scene corresponding to the distant objects. Although there is no optical system disclosed in the Japanese laid open patent application for accomplishing this objective, it would be very difficult to develop an optical system to completely blur an oncoming headlamp. Failure to blur oncoming headlamps could cause false triggering of the system disclosed in the above-identified Japanese laid open patent application.

In commonly assigned U.S. Pat. Nos. 5,923,027 and 6,097,024, a moisture sensing system is disclosed that overcomes the problems noted above. Nevertheless, it would be desirable to further improve the ability of the disclosed system to distinguish from light sources within the imaged scene that may cause false triggering of the windshield wipers.

German Patent No. DE 198 03 694 C1 discloses a moisture sensing system in which two one-dimensional images are acquired of substantially the same portion of a vehicle windshield. The images are subtracted from one another to remove far field objects. In one embodiment, a single one-dimensional array of sensors is used and light from two different and offset light sources is sequentially directed towards the imaged portion of the windshield. The sensor array senses the reflections from any moisture on the windshield. A first image is acquired using the first light source and then stored, and subsequently, a second image is acquired using the second light source. The two images are then subtracted from one another to remove far field objects. This embodiment is highly dependent upon the ability of the system to distinguish the light from the two light sources from high levels of ambient light. Also, because the two images are acquired sequentially, there is a greater possibility that the far field objects in the two images will have moved and thus appear as a near field image.

German Patent No. DE 198 03 694 C1 discloses a second embodiment in which two separate, horizontally offset, one-dimensional image sensor arrays are used in combination with two separate lenses, to image the same portion of the windshield. While this embodiment overcomes some of the problems noted above with respect to the first embodiment, it increases the cost of the system by requiring two separate image sensor arrays. Neither of the two embodiments provides a very robust image from which useful information such as the spatial distribution of objects on the windshield may be obtained, or from which abnormalities in the detected light levels may be readily discarded.

SUMMARY OF THE INVENTION

According to one embodiment of the present invention, a moisture sensing system is provided that reliably distinguishes far field objects, such as vehicle lights and other light sources that may be in the ambient surroundings, from near field images, such as moisture on a vehicle windshield. To achieve these and other aspects and advantages, a system is provided for detecting moisture on a surface that comprises a sensor array having first and second portions, at least one optical system operative to image the same portion of the surface onto both of the portions of the sensor array, and a processing system in communication with the sensor array and operative to analyze images from the first and second portions of the sensor array to detect moisture.

According to another embodiment of the present invention, a moisture sensing system is provided that reliably distinguishes far field objects, such as vehicle lights and other light sources that may be in the ambient surroundings, from near field images, such as moisture on a vehicle windshield. To achieve these and other aspects and advantages, a system is provided for detecting moisture on a surface that comprises first and second sensor arrays spatially offset from one another, at least one optical system operative to image the same portion of the surface onto both of the sensor arrays, and a processing system in communication with the sensor arrays and operative to analyze images from the sensor arrays to detect moisture. The processing system reads image data from at least one row, but less than all rows of the first sensor array and image data from corresponding row(s) of the second sensor array, compares the image data read, and stores the result of the comparison prior to reading image data from additional rows of the sensor arrays.

According to another embodiment, a windshield wiper control system for a vehicle is provided that comprises first and second two-dimensional image sensors, an optical system operative to image the same portion of the surface of the vehicle windshield onto the first and second image sensors, and a processing circuit in communication with the image sensor and operative to analyze images from the image sensors to detect moisture on the windshield and to activate the windshield wipers when moisture is detected.

According to another embodiment of the present invention, a system is provided for use in a controlled vehicle that comprises an optical system including an array of sensors, and a processing subsystem in communication with the sensors for sensing moisture on a windshield of the controlled vehicle and for detecting lights of vehicles generally in front of the controlled vehicle and controlling exterior lights of the controlled vehicle, wherein the processing subsystem disables activation of high beam headlamps of the controlled vehicle when moisture is detected on the vehicle windshield.

According to another embodiment of the present invention, a system is provided for use in a controlled vehicle that comprises an optical system including two arrays of sensors and a red filter for filtering all but red light from light projected onto one of the two sensor arrays, a light source for projecting red light onto a windshield of the controlled vehicle, and a processing subsystem in communication with the sensors for sensing moisture on the windshield of the controlled vehicle.

These and other features, advantages, and objects of the present invention will be further understood and appreciated by those skilled in the art by reference to the following specification, claims, and appended drawings.

BRIEF DESCRIPTION OF THE DRAWINGS

In the drawings:

FIG. 3A illustrates the imaging of a far field object using the inventive moisture sensing system;

FIG. 3B illustrates exemplary images obtained by the two image sensor array portions of the inventive moisture sensing system when a far field object, such as that shown in FIG. 3A, is imaged;

FIG. 3C shows the resultant far field image from subtracting one stereo image from the other in accordance with the moisture sensing system of the present invention;

FIG. 4A illustrates the imaging of a near field object using the inventive moisture sensing system;

FIG. 4B illustrates exemplary images obtained by the two image sensor array portions of the inventive moisture sensing system when a near field object, such as that shown in FIG. 4A, is imaged;

FIG. 4C shows the resultant near field image from subtracting one stereo image from the other in accordance with the moisture sensing system of the present invention;

DETAILED DESCRIPTION OF THE PREFERRED EMBODIMENTS

A moisture sensing system in accordance with the present invention is able to detect moisture on a surface such as the windshield of a vehicle. Such a system is useful for automatically controlling the vehicle's windshield wipers, defroster, and/or defogging systems. The system for sensing moisture on a vehicle windshield eliminates many of the performance deficiencies of known moisture sensing systems and provides a moisture sensing system at a commercially viable cost. As used herein, the term moisture is used to designate various types of moisture and precipitation which can be found on the windshield of a vehicle during various climatic conditions, such as rainfall, snow fall, ice, fog as well as other substances that are commonly deposited on a vehicle windshield such as bugs, dust, and the like. The system is able to provide superior performance to other known systems during rather common climatic conditions, such as ice, fog, and varying levels of rain and snow fall and the like.

As will be discussed in more detail below, the same portion of the windshield is imaged onto both a first image sensor array and a second image sensor array. As discussed in detail below, the two images obtained from the first and second image sensor arrays may then be digitized and compared to one another. By obtaining and analyzing two images of the same area from two slightly different perspectives, the processing system may utilize the principle of binocular disparity (also known as stereo imaging) to provide the capability of distinguishing near field objects from far field objects thereby eliminating the need for expensive optics to blur far field objects.

Figure 1:
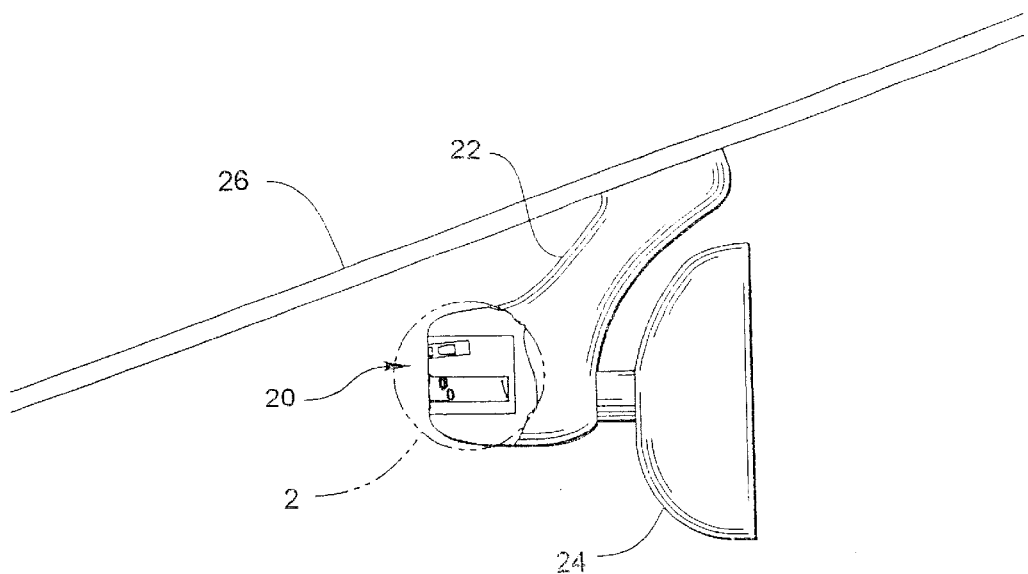
FIG. 1 is a side elevational view showing a rearview mirror assembly incorporating a moisture sensing system constructed in accordance with the present invention.

Referring to FIG. 1, the moisture sensing system of the present invention is generally identified with the reference numeral 20. The moisture sensing system may be mounted stationary in the mounting bracket 22 of an automobile rearview mirror 24 or alternatively mounted in the rear portion of the rearview mirror housing 24. As yet other alternatives, the moisture sensing system could be mounted in an overhead console, A-pillar, instrument panel dash, a windshield-mounted console, or in any other vehicle accessory. The moisture sensing system 20 includes an image sensor 32 mounted, for example, 55–105 mm behind the vehicle windshield 26 with the optical axis substantially parallel to ground or slightly angled to the ground. The angle of the windshield 26 in a modern passenger car varies considerably from model to model. An example of the angle of a car windshield is about 27°. The windshield angle of trucks may be much different. Such a configuration may cause the raindrops and other moisture to be at a different distance from the image sensor 32 depending on where the moisture is with respect to the field of view of the image sensor 32. To help compensate for this problem, the image sensor 32 may be angled toward the windshield 26 such that the top of the image sensor 32 is moved closer to the windshield 26. For example, with a windshield angle of about 27°, image sensor 32 may be angled approximately 12–17° toward the windshield 26.

When the image plane is not parallel to the object plane, the optimal focus is obtained when the object and image planes intersect each other at the plane of the lens. This is known as the Scheimpflug condition details of which can be found in "Modern Optical Engineering," by Warren J. Smith (page 52).

Alternatively, a lens system designed with an appropriate depth of field may substantially blur the image of the surface of the windshield when the image sensor is positioned parallel to the lens plane. Nevertheless, such blurring is not necessary when using stereoscopic imaging as described herein. In fact, it may be beneficial to combine the features of the rain sensor of the present invention with a headlamp dimming system such that a common image sensor array may be used for both functions. In such an arrangement, it is desirable to configure the optical system to have a sufficient depth of field to image objects both on the windshield (i.e., rain) and in the distance (i.e., headlamps). Thus, utilizing a stereoscopic imaging sensor configuration allows a common optical system to be used for both functions.

Figure 2:
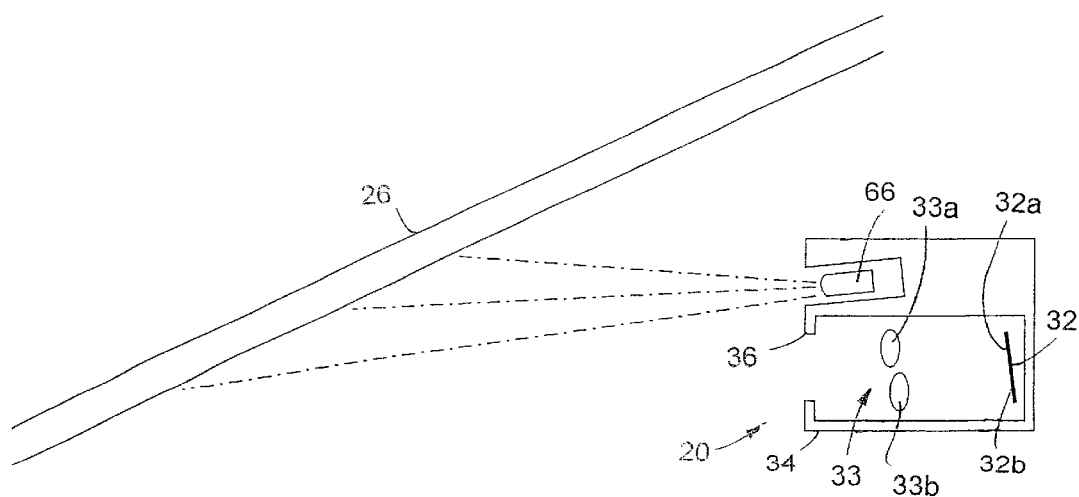
FIG. 2 is an enlarged view showing the moisture sensing system constructed in accordance with the present invention.
Figure 5:
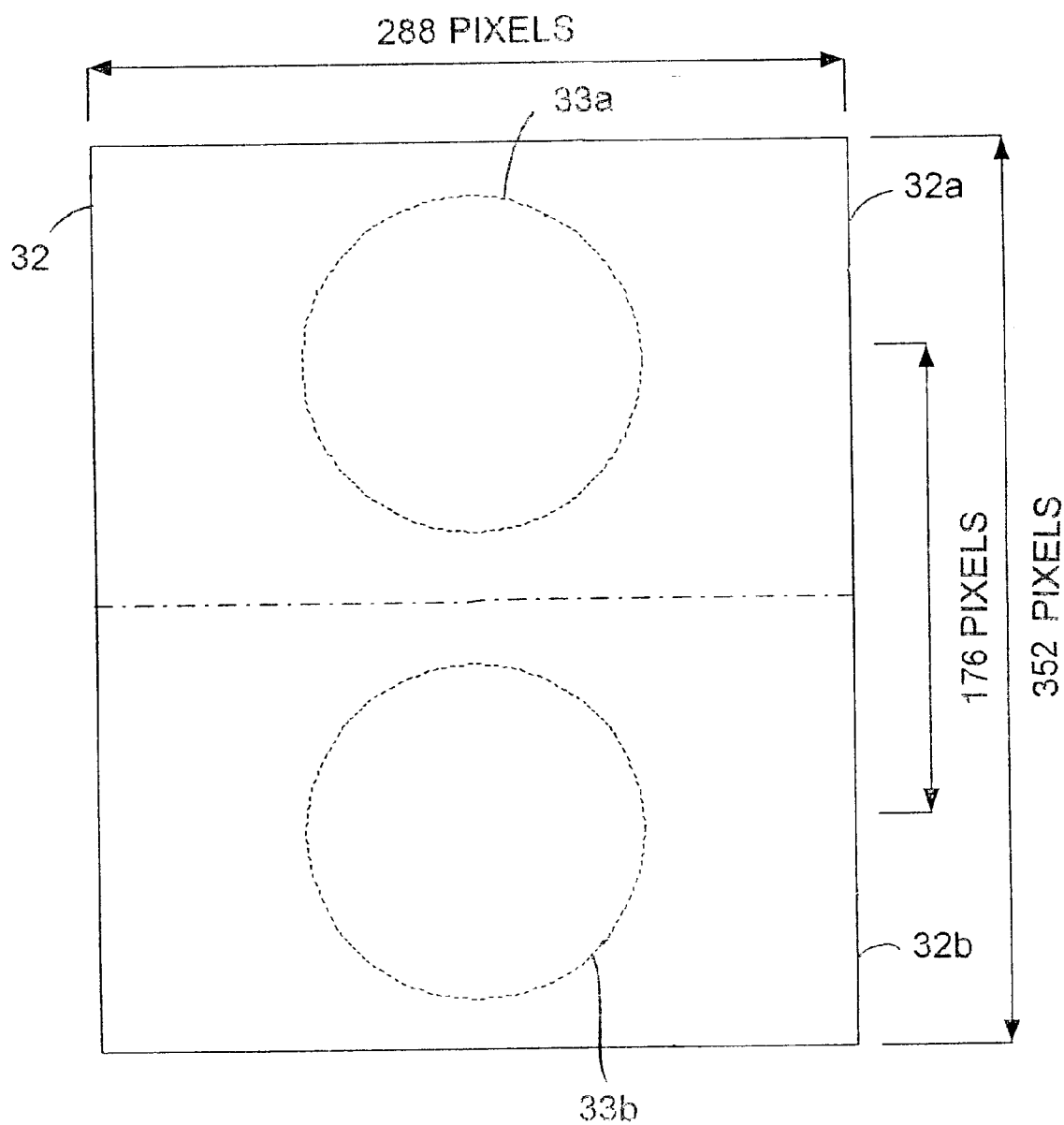
FIG. 5 is a plan view of an example of the CIF imager with the two lenses of the optical system superimposed thereon.
Figure 6A:
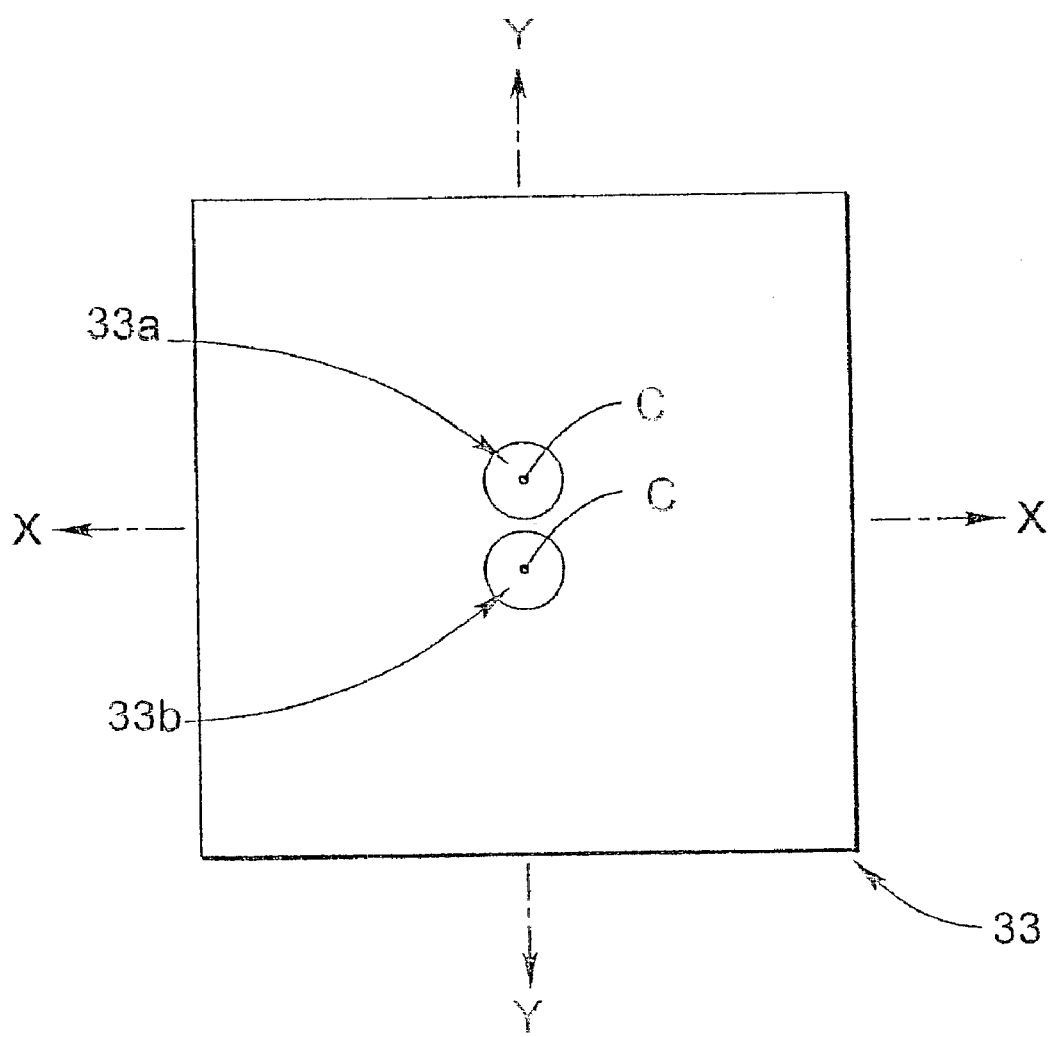
FIG. 6A is a top plan view of a lens 33 that may be used in the inventive moisture sensing system.
Figure 6B:
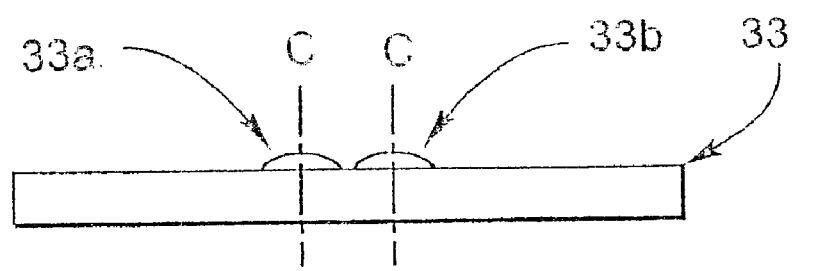
FIG. 6B is a side elevational view of the lens shown in FIG. 6A.

There are four main components to the inventive moisture sensing system 20: an imaging optical system; a light emitting diode; an image sensor; and a processing system. The imaging optical system is shown in FIGS. 2, 6A, and 6B while the image sensor is illustrated in FIGS. 2 and 5.

The imaging optical system is used to image a predetermined portion of the windshield 26 onto two sensor arrays 32a and 32b of the image sensor 32 such that objects at the approximate distance of the windshield 26 are more sharply in focus at the image plane while objects at a longer distance are more out of focus and blurred. The area of the windshield 26 that is imaged should be large enough that the probability of receiving raindrops during relatively light rain conditions is significant. Moreover, the imaged area of the windshield should also be in the area of the windshield that is wiped by the windshield wipers.

The imaging optical system may include two biconvex lenses 33a and 33b. The lenses 33a and 33b may be carried by a mechanical lens mount 34, which forms a stop 36 about 5 mm diameter directly in front of the lenses. The image sensor 32 is located behind the lenses 33 and may be slightly angled by about 12–17°.

Lenses 33a and 33b may be micro-lenses formed in a common element. An example of such a structure is shown in FIGS. 6A and 6B. More elaborate optical systems, for example, with additional elements, aspherical elements, or defractive objects, could all be used especially if shorter distance from the windshield is a desired feature. However, since the collected images are not for photographic purposes, such optical quality is not necessary in an application for moisture detection.

The image sensor 32 is preferably a CMOS active pixel image sensor. CMOS active pixel image sensors provide low cost, high sensitivity imaging on a chip manufactured in a CMOS process. Such CMOS active pixel image sensors have several advantages over other sensors including low power consumption, popular CMOS production techniques, low cost, ability to integrate additional circuitry on the same chip, variable read out windows, and a variable light integration time. Such CMOS active pixel image sensors are commercially available from Photobit Inc., Pasadena, Calif., including, for example, Photobit part No. PB-0111. Suitable systems are described in detail in commonly assigned U.S. Pat. No. 5,990,469, entitled "CONTROL CIRCUIT FOR IMAGE ARRAY SENSORS," by Jon H. Bechtel et al., and commonly assigned U.S. Pat. No. 6,008,486, entitled "WIDE DYNAMIC RANGE OPTICAL SENSOR," by Joseph S. Stam et al., the entire disclosures of which are incorporated herein by reference. The ability to obtain images from separate subwindows of the CMOS image sensor make it particularly suitable for the present invention in which the image sensor array is divided into two arrays or "subwindows." In a preferred embodiment, the processing system independently controls the exposure of various subwindows of each of the image sensor array portions 32a and 32b in the manner disclosed in commonly assigned U.S. patent application Ser. No. 09/970,728, entitled "MOISTURE SENSOR AND WINDSHIELD FOG DETECTOR," filed concurrently herewith by Joseph S. Stam et al., the entire disclosure of which is incorporated herein by reference.

While CMOS active pixel sensors have substantial advantages, other image sensors are also suitable and are considered to be within the scope of the present invention. The size and number of pixels is determined to image an area of the windshield sufficiently large and in enough detail to adequately detect light rain while remaining cost effective. For example, a 64×80 active pixel array divided into two equal arrays 32a and 32b, and having a 30 $\mu$m pixel size, will image approximately a 30 mm×30 mm area on a standard passenger car windshield. According to a more preferred example, a Photobit PB-0111 Common Intermediate Format (CIF) Imager is used that has a 352×288 active pixel array with pixel spacing of 7.8 $\mu$m. FIG. 5 shows an example of the CIF imager with the two lenses of the optical system superimposed thereon. As illustrated, portions 32a and 32b are each 288×176 arrays with the pixels disposed at the centers of the two lenses 33a and 33b being separated by about 176 pixels or 1.3728 mm. Aspheric 1 mm thick acrylic lenses 33a and 33b are 1.0 mm in diameter, have a radius of 2.20 mm, a conic constant of −1.0, and are positioned 3.8 mm from the image sensor surface. The focal length of lenses 33a and 33b is 4.5 mm at 680 nm wavelengths. The maximum field of view is 17.4° by 28.0°. With an examplary windshield to lens distance set to 85 mm, the maximum viewable area is 43 mm by 63 mm for a 27° windshield angle. With an examplary windshield to lens distance set to 55 mm, the maximum viewable area is 28 mm by 41 mm for a 27° windshield angle.

While both the first and second image sensor arrays 32a and 32b are disclosed as being subwindow portions of a single image sensor array 32, it will be appreciated that first and second image sensor arrays 32a and 32b may be implemented using two separate image sensing devices, particularly if a greater separation distance is desired.

Figure 7:
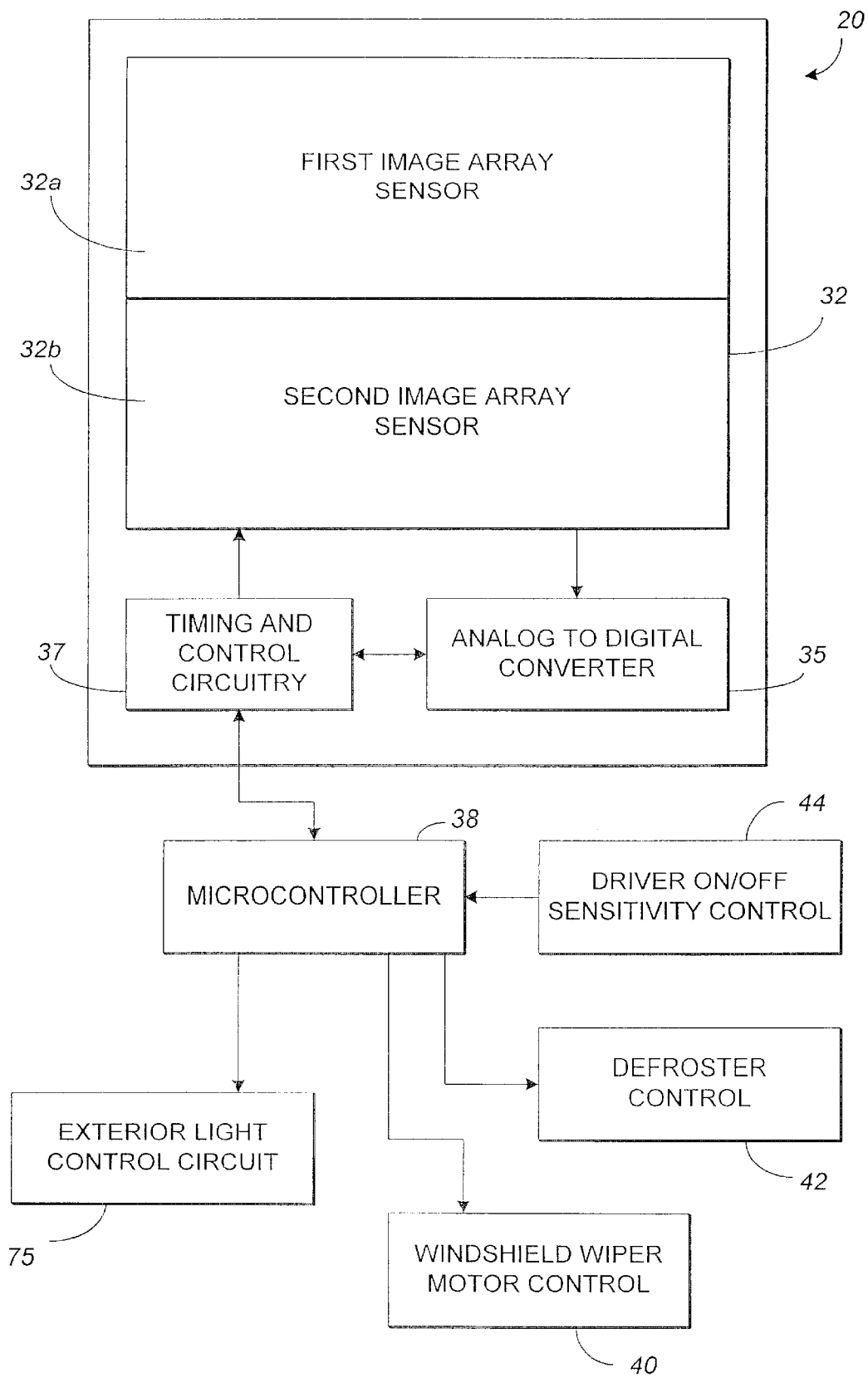
FIG. 7 is a block diagram of an electrical circuit of the moisture sensing system of the present invention.

A block diagram of the moisture sensing circuitry is shown in FIG. 7. As mentioned above, a predetermined portion of the windshield 26 is imaged onto two array portions 32a and 32b of an image sensor 32. The image sensor is controlled by a processing system/circuit that also reads and processes the data obtained from sensor 32. The processing system includes an analog-to-digital converter 35, a timing and control circuit 37, and a microcontroller 38. The analog voltage of each of the pixels within the sensor 32 is converted to digitized grayscale value by way of the analog-to-digital converter 35. The analog-to-digital converter 35 is operated under the control of the timing and control circuit 37, which, in turn, is controlled by the microcontroller 38. The timing and control circuit 37 is described in detail in commonly assigned U.S. Pat. No. 5,990,469, entitled "CONTROL CIRCUIT FOR IMAGE ARRAY SENSORS," by Jon H. Bechtel et al., the entire disclosure of which is incorporated herein by reference.

A suitable microcontroller 38 is a Motorola STAR 12™, part No. MCS912D64. In the event that the microcontroller does not contain sufficient random access memory (RAM) to store an entire image from the image sensor, the windowing feature of the CMOS imaging sensors may be used to alternatively image and process different regions of small enough size for the onboard RAM of the microcontroller 38. Alternatively, the in-line processing procedure disclosed in commonly assigned U.S. patent application Ser. No. 09/799,310, entitled "IMAGE PROCESSING SYSTEM TO CONTROL VEHICLE HEADLAMPS AND OTHER VEHICLE EQUIPMENT," filed on Mar. 5, 2001, by Joseph S. Stam et al. may be used to reduce the memory requirements of the processor. The entire disclosure of the '310 application is incorporated herein by reference.

As disclosed in the above referenced U.S. patent application Ser. No. 09/970,728, a moisture sensing system, such as that disclosed herein, may not only allow subwindows of the image sensor array to be separately imaged, but also the exposure level of the subwindows may be independently adjusted. It may also be desirable, in accordance with the teachings of the above Ser. No. 09/970,728 application, to utilize a narrowband filter and a supplemental light source 66 (i.e., an LED) to illuminate the imaged area of the windshield. Separate images may be obtained with and without the supplemental illumination and compared to one another using, for example, correlated double sampling techniques to aid in imaging the surface of the windshield during low ambient light conditions, and to aid in distinguishing between near-field and far-field objects. Thus, four images may effectively be attained and processed—a first image A through lens 33a without supplemental illumination, a second image A' through lens 33a with supplemental illumination, a third image B through lens 33b without supplemental illumination, and a fourth image B' through lens 33b with supplemental illumination. Thus, subtracting the image data without supplemental illumination from the image data with supplemental illumination yields image data with the external illumination removed (i.e., A'–A and B'–B). Then, to compare the image through lens 33a with that through 33b, one would perform the following processing: (A'–A)–(B'–B). To minimize the required memory for this processing, one could read images (A' and B') through both lenses 33a and 33b with the illuminator on, subtract these two images (i.e., A'–B'), read images (A and B) through both lenses 33a and 33b with the illuminator off, subtract these two images (i.e., A–B), and then subtract the latter difference from the first difference (i.e., (A'–B')–(A–B)).

Once an image is acquired by each image sensor array 32a and 32b of image sensor 32, the luminance of each pixel, represented by an analog voltage, is converted to a digital grayscale value by the analog-to-digital converter 35. These values are written to memory, which may be on board the microcontroller 38 and processed by the microcontroller 38 or alternatively a digital signal processor.

The digitized images from the first and second image sensor arrays 32a and 32b are compared to one another to distinguish far field objects from near field objects. As shown in FIGS. 3A and 3B, a far field object (shown as a tree) is imaged onto the same positions of the image sensor arrays 32a and 32b relative to the optical axes of lenses 33a and 33b. As shown in FIG. 3C, when the two images are subtracted from one another, the image(s) of the far field object(s) is removed from the resultant image. As shown in FIGS. 4A and 4B, a near field object, such as a raindrop on the windshield, is imaged onto different positions of the image sensor arrays 32a and 32b. As shown in FIG. 4C, when the two images are subtracted from one another, the image(s) of the near field object(s) is not removed from the resultant image unlike the images of any far field objects that may be present.

The two images may be obtained simultaneously in the two subwindows of a single image array sensor and the image data may be read from the two subwindows in an interleaved manner. For example, a first row of the first subwindow may be read, a first row of the second subwindow may be read, and then a comparison made of the first rows of the two subwindows. Subsequently, second rows of the two subwindows may be read, compared, and so on. By reading the image data in an interleaved manner, less memory is required to store the image data of both subwindow images. Once the row data has been compared, only the comparison data need be stored and the row data may be discarded before reading the next row data for the two subwindows. This approach simplifies the processing and reduces cost. This also minimizes any temporal error making the estimation of a difference between the subwindows more accurate. In a similar manner, more than one row but less than all the rows may be read from each subwindow and compared. See the above-referenced U.S. Pat. No. 5,990,469 for examples of how such image reading may be accomplished. It should also be noted that a the image sensor 32 may be oriented with respect to the optical system such that when one row of data is read, the row crosses both regions 32a and 32b of the array and thus the single row of data includes corresponding data from both regions 32a and 32b. Thus, a single row may be read and half of the row may be subtracted from the other half to attain the benefits of the present invention.

In a preferred implementation, lenses 33a and 33b are positioned between about 55 to 85 mm back from the windshield with the centers of the lenses laterally offset from one another about 1.3 mm. The distance from the windshield may be increased by increasing the offset between lenses 33a and 33b. With the preferred implementation, objects greater than 150 to 200 mm from the lenses are effectively treated as far field objects that are removed from the imaged scene using the above-described inventive technique. To demonstrate, a computational analysis of the preferred system is described below.

Figure 8:
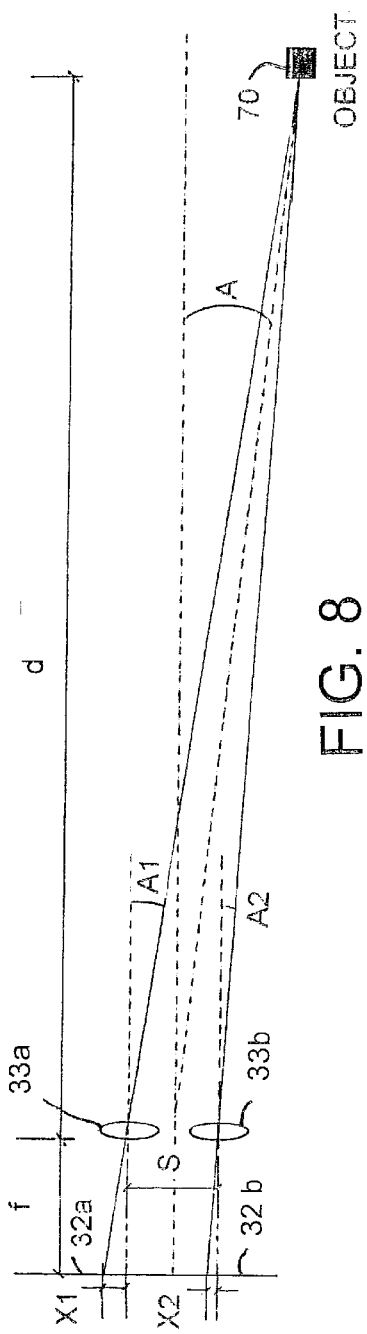
FIG. 8 is a schematic view of the inventive system with an object positioned a distance d from the plane of lenses and disposed at an angle A from the center of the optical system.

FIG. 8 shows an object 70 positioned a distance d from the plane of lenses 33a and 33b and disposed at an angle A from the center of the optical system. Lenses 33a and 33b are disposed a distance from image sensor 32 corresponding to the focal length f of the optical system and the central axes of lenses 33a and 33b are separated by a distance s. In FIG. 8, A1 corresponds to the angle between the imaged object and the center of lens 33a, A2 corresponds to the angle between the imaged object and the center of lens 32b, X1 corresponds to the position of the image through lens 33a on the image plane, and X2 corresponds to the position of the image through lens 33b on the image plane. Using the preferred CIF imager:

$A(\alpha) \equiv \alpha \cdot \pi/180$ $s \equiv 1.3728$ mm $f \equiv 4.5$ mm $p \equiv 7.8$ μm where p is the imager pixel size/spacing. The angles A1 and A2 may be computed as follows:

$A1(d,\alpha) \equiv a\tan[(d \cdot \tan(A(\alpha))+s/2)]/d$ $A2(d,\alpha) \equiv a\tan[(d \cdot \tan(A(\alpha))-s/2)]/d$ Assuming that the image angle is the same as the object angle (pinhole lens approximation), the positions X1 and X2 of the images on the image plane relative to the center of the lenses 33a and 33b, respectively, may be computed as follows:

$X1(\alpha 1) \equiv f \cdot \tan(\alpha 1)$ $X2(\alpha 2) \equiv f \cdot \tan(\alpha 2)$ In pixels, the positions are:

$X1_p(\alpha 1) \equiv X1(\alpha 1)/p$ $X2_p(\alpha 2) \equiv X2(\alpha 2)/p$

Figure 9:
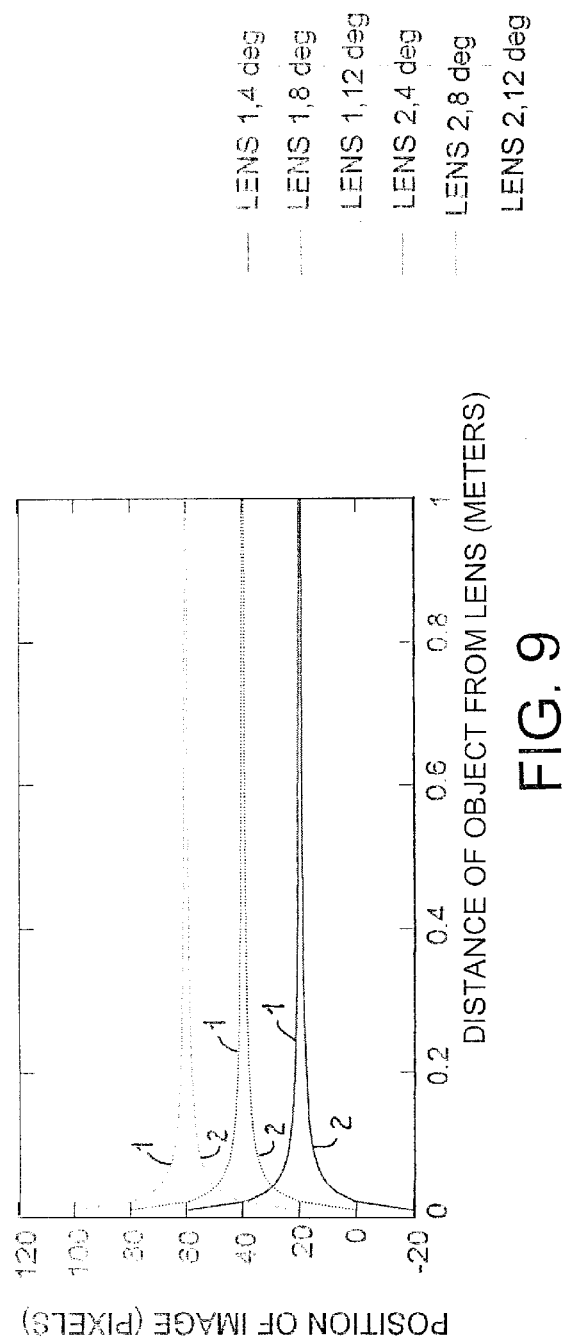
FIG. 9 is a plot of the pixel positions of the images through both lenses at the image plane as a function of the distance d of the object from the lenses for 4, 8, and 12 degree angles A.
Figure 10:
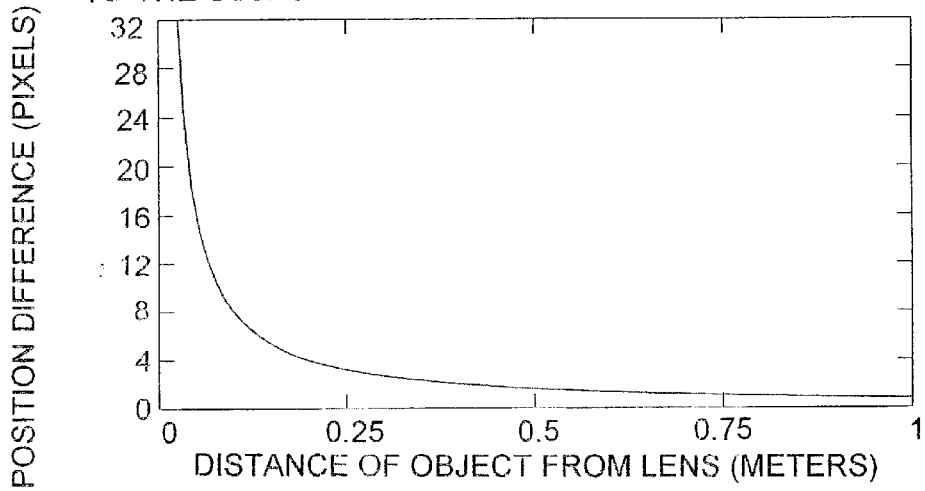
FIG. 10 is a plot of the position difference between an image through lens 33a and a corresponding image through lens 33b as a function of the distance to the object showing distances of 0 to 1 m.
Figure 11:
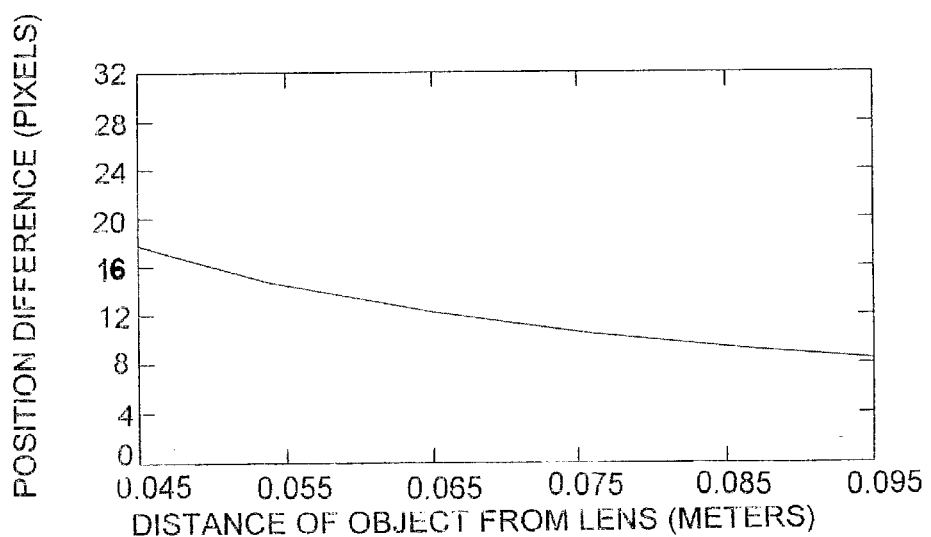
FIG. 11 is also a plot of the position difference between an image through lens 33a and a corresponding image through lens 33b as a function of the distance to the object showing distances of 45 mm to 95 mm.

FIG. 9 shows a plot of the pixel positions of the images through both lenses at the image plane as a function of the distance d of the object from the lenses for 4, 8, and 12 degree angles A. FIG. 10 is a plot of the position difference between an image through lens 33a and a corresponding image through lens 33b as a function of the distance to the object showing distances of 0 to 1 m. FIG. 11 is also a plot of the position difference between an image through lens 33a and a corresponding image through lens 33b as a function of the distance to the object showing distances of 45 mm to 95 mm. As apparent from FIGS. 9–11, the difference between the positions of the images is virtually zero for objects at a distance of 1 m or more, while the distance between the positions of the images is at least 8 pixels for distances of 95 mm or less. Accordingly, distant objects may effectively be removed by subtraction of the images, while near objects on the windshield surface would remain after subtraction. The difference between the positions of the images through lenses 33a and 33b is virtually unchanged for different object angles A.

The present invention thus enables raindrops to be readily distinguished from distant objects, and particularly from headlamps, tail lamps, street lights, traffic lights, and other light sources that are otherwise difficult to distinguish from raindrops on a vehicle windshield.

In general, the two images from first and second image sensor arrays 32a and 32b are compared to determine the presence of any relative error. The relative error may be determined by considering the raw difference between the images, by computing and analyzing the squared error ratio, or most preferably by computing and analyzing the correlation constant.

To further enhance the accuracy of the system and to enable the system to distinguish between raindrops and windshield cracks or debris on the windshield, the processing system 38 may utilize edge detection techniques and may analyze the spatial high frequency components of the image(s). The edge detection may be performed separately on the images from first and second image sensor arrays 32a and 32b before comparison or may be performed on the image formed as a result of the comparison with the far field objects already removed. More specifically, raindrops are detected by quantifying the discontinuity resulting from sharp edges of the raindrops on the windshield. These sharp edges are caused by the focused images of the rain or other moisture droplet along with the random optical imaging of far field objects by the droplets or other moisture. Laplacian, Sobel, or preferably Prewitt filtering may be employed for detecting the edges in the images.

The processing system may analyze the images from the first and second image sensor arrays for sharp discontinuities caused by the edges of the water rain droplets or other moisture and by random focusing of the distant objects by the droplets. These discontinuities represent high spatial frequency components. The magnitude of the spatial high frequency components is used to control a windshield wiper motor control 40 such that the frequency of wiping of the windshield wiper blades (i.e., time interval between wipes) is controlled as a function of the amount of moisture on the windshield.

The system described above may also be used to detect the passing of the wiper blades past the imaged area of the windshield. If the wipers of the automobile are designed in such a way that the wipers are never approximately vertical when it crosses the imaged area, the filters described above can be modified to accommodate such a configuration. For example, various other edge detection methods well known in the art of image processing can also be used. Additionally, if the wiper speed for the vehicle windshield wipers is so fast that it blurs slightly in the image for the necessary exposure time, the horizontal filter can be modified to subtract the pixels two positions to the left and right of the current pixel instead of the pixels immediately next to the current pixel.

After the wiper has cleared the imaged area, additional images of the windshield are acquired. These images may be used as a zero point measurement that may be subtracted from all subsequent measurements until the next wipe. In this way, long-term high frequency spatial components in the image of dirty windshield, cracks, scratches, and frozen ice will not contribute to the detected amount of rain.

If the windshield wiper is not detected within a given time frame, the system assumes that a malfunction has occurred, which can be caused as a result of the windshield wiper being frozen to the windshield. During such a condition, the operation of the moisture sensor in accordance with the present invention can be suspended for a period of time to allow the ice to thaw. If outside temperature information is available, freezing climate conditions can be taken into account to decide if the wipers are failing because of a mechanical malfunction or due to ice.

The system is also able to adapt to varying light levels. In particular, during selected cycles, the average grayscale value of the image may be computed. If this value is high, indicating an over exposure to light, the integration time in the following cycle may be reduced to lower the average brightness. Similarly, if the light level is low, the integration time may be increased. In relatively dark conditions, some image sensors may not be capable of collecting enough light in a reasonable time to adequately image moisture such as raindrops. In such a situation, an additional illuminator 66 may be provided to briefly illuminate the area of interest from behind while the images are being taken. If the windshield of the vehicle is not highly absorbent to infrared radiation, a near infrared illuminator can be used as long as the wavelengths are within the detectable region of the image sensor. An infrared illuminator has the benefit of not being visible to the human eye and thus not distracting to the driver.

In order to provide selectivity of a system, a driver on/off sensitivity control circuit 44 may be provided. This control circuit 44 may be used in special circumstances, for example, when the vehicle is in an automatic car wash to prevent spurious operation of the system. The intermittent wiper control may be used to allow adjustment of the system's sensitivity.

The system of the present invention may also include a mechanism for detecting fog on the inside or outside surface of the windshield. Such a mechanism is disclosed in U.S. Pat. No. 5,923,027, the entire disclosure of which is incorporated herein by reference. To implement such a fog detecting mechanism to the moisture sensing system of the present invention, an illuminator, such as an LED, would be added in addition to illuminator 66. Unlike illuminator 66, which illuminates the entire imaged area of the windshield, the additional illuminator would be configured to project a focussed spot of light onto the windshield that is then sensed using one or both of the image sensor arrays. Occasionally when driving up a hill, the vehicle could be positioned in such a way that the sun is directly imaged by the device. The radiative loading caused by this alignment may damage the image sensor 32 over time. In order to alleviate such a problem, an electrochromic filter may be used to temporarily eliminate most of the sunlight from the image plain. Other optical electronic or optical mechanical devices could also be used.

As disclosed above, the moisture sensing system of the present invention may be integrated with a headlamp dimmer system. Examples of headlamp dimming systems are disclosed in commonly-assigned U.S. Pat. Nos. 5,837,994, 6,049,171, 6,255,639, and 6,281,632, the entire disclosures of which are incorporated herein by reference. As mentioned above, moisture sensing and headlamp dimming systems may share the same optical system. The inventive stereoscopic moisture sensing system is particularly well-suited for such integration since the optical system does not need to be configured to blur distant objects as do other forms of moisture sensing systems that utilize image sensors. Additionally, the above-noted patents disclose headlamp dimming circuits that utilize optical systems similar to that disclosed herein.

FIG. 7 shows an electrical circuit diagram in block form illustrating an integrated moisture sensing/headlamp dimming system of the present invention. As illustrated a common microcontroller 38 is used to process image data from a common sensor array 32. In addition to controlling the operation of windshield wipers and defrosters, microcontroller 38 controls the operation of the exterior lights 75 of the vehicle. Such exterior lights 75 include high and low beam headlamps, daytime running lamps, foul weather lights such as fog lights, parking lights, tail lights, brake lights, etc. While the processing of data for headlamp dimming functions and for moisture sensing functions differs considerably and both processing functions otherwise would require most of the processing power of the microprocessor 38, measures can be taken to reduce processing loads for both functions and to otherwise balance processing tasks for both applications. In particular, because it is generally advisable to only operate low beam headlamps when it is raining, microcontroller 38 may simply disable the vehicle's high beam headlamps when moisture is detected and/or the windshield wipers are operating, and expend its processing resources on the moisture sensing function. Similarly, during times of relatively high ambient brightness, processing resources do not need to be spent on detecting vehicles for headlamp dimming, but rather can be spent on moisture sensing. If necessary, another processor may be employed to preprocess the data read from the image sensor prior to passing the processed data on to microcontroller 38. For example, as disclosed in U.S. patent application Ser. No. 09/800,460, entitled "SYSTEM FOR CONTROLLING EXTERIOR VEHICLE LIGHTS," filed on Mar. 5, 2001, by Joseph Stam et al., the extra processor may be used to identify light lists of lights forward of the vehicle that are possibly other vehicles. The entire disclosure of U.S. patent application Ser. No. 09/800,460 is incorporated herein by reference. Similarly, such an extra processor could be used to perform edge detection on objects detected on the windshield.

While the invention has been described in detail herein in accordance with certain preferred embodiments thereof, many modifications and changes therein may be effected by those skilled in the art without materially departing from the novel teachings and advantages of this invention. Accordingly, all such modifications are intended to be included within the scope of this invention as defined in the following claims and, therefore, it is our intent to be limited only by the scope of the appending claims and not by way of the details and instrumentalities describing the embodiments shown herein.

The invention claimed is:

1. A system for detecting moisture on a surface comprising:
   a sensor array having first and second portions;
   at least one optical system operative to image the same portion of the surface onto both of said portions of said sensor array; and
   a processing system in communication with said sensor array and operative to analyze images from said first and second portions of said sensor array to detect moisture, wherein said processing system is configured to detect edges of objects in the images from said image sensor array portions.

2. The system of claim 1, wherein said processing system is further configured to compare the relative position of edges detected in an image from said first portion of said sensor array with the relative position of edges detected in an image from said second portion of said sensor array to distinguish objects on the surface from far field objects.

3. A system for detecting moisture on a surface comprising:
   a sensor array having first and second portions;
   at least one optical system operative to image the same portion of the surface onto both of said portions of said sensor array; and
   a processing system in communication with said sensor array and operative to analyze images from said first and second portions of said sensor array to detect moisture, wherein said processing system is configured to compare the relative position of objects in an image from said first portion of said sensor array with the relative position of objects in an image from said second portion of said sensor array to distinguish objects on the surface from far field objects.

4. The system of claim 3, wherein said first and second portions of said sensor array are vertically offset from one another.

5. The system of claim 3 and further including a rearview mirror assembly, wherein said sensor array is supported on said rearview mirror assembly.

6. The system of claim 3 and further including a rearview mirror assembly, wherein at least a portion of said processing system is supported on said rearview mirror assembly.

7. The system of claim 3, wherein said first and second portions of said sensor array are two-dimensional arrays.

8. The system of claim 3, wherein said first and second portions of said sensor array acquire data simultaneously.

9. A system for detecting moisture on a surface comprising:
- a sensor array having first and second portions;
- at least one optical system operative to image the same portion of the surface onto both of said portions of said sensor array; and
- a processing system in communication with said sensor array and operative to analyze images from said first and second portions of said sensor array to detect moisture, wherein said processing system is configured to digitize and subtract images from said first and second portions of said sensor arrays to distinguish objects on the surface from far field objects.

10. A system for detecting moisture on a surface comprising:
- a sensor array having first and second portions;
- at least one optical system operative to image the same portion of the surface onto both of said portions of said sensor array; and
- a processing system in communication with said sensor array and operative to analyze images from said first and second portions of said sensor array to detect moisture, wherein said processing system reads image data from at least one row but less than all rows of said first portion of said sensor array and image data from corresponding row(s) of said second portion of said sensor array, compares the image data read, and stores the result of the comparison prior to reading image data from additional rows of said first and second portions of said sensor array.

11. A system for detecting moisture on a surface comprising:
- first and second sensor arrays spatially offset from one another;
- at least one optical system operative to image the same portion of the surface onto both of said sensor arrays; and
- a processing system in communication with said sensor arrays and operative to analyze images from said sensor arrays to detect moisture, wherein said processing system reads image data from at least one row but less than all rows of said first sensor array and image data from corresponding row(s) of said second sensor array, compares the image data read, and stores the result of the comparison prior to reading image data from additional rows of said sensor arrays.

12. The system of claim 11, wherein said processing system is configured to detect edges of the images from said image sensor arrays.

13. The system of claim 11, wherein said first and second sensor arrays are two-dimensional arrays.

14. The system of claim 11, wherein said first and second sensor arrays are portions of two separate image sensor.

15. The system of claim 11, wherein said first and second sensor arrays are two different portions of the same image sensor.

16. The system of claim 11, wherein said first and second sensor arrays are vertically offset from one another.

17. The system of claim 11 and further including a rearview mirror assembly, wherein said first and second sensor arrays are supported on said rearview mirror assembly.

18. A method of detecting moisture on a surface comprising the steps of:
- obtaining two two-dimensional images of the same portion of the surface from two different angles;
- digitizing the two images; and
- subtracting the two digitized images from one another to thereby remove far field objects from a resultant image while leaving information relating to near field objects in the resultant image, wherein the near field objects correspond to moisture on the surface.

19. A windshield wiper control system for a vehicle comprising:
- first and second two-dimensional image sensors;
- an optical system operative to image the same portion of the surface of the vehicle windshield onto said first and second image sensors; and
- a processing circuit in communication with said image sensors and operative to analyze images from said image sensors to detect moisture on the windshield and to activate the windshield wipers when moisture is detected, wherein said processing circuit is configured to detect edges of objects in the images from said image sensors.

20. The system of claim 19, wherein said processing circuit is further configured to compare the relative position of edges detected in an image from said first image sensor with the relative position of edges detected in an image from said second image sensor to distinguish objects on the surface from far field objects.

21. A windshield wiper control system for a vehicle comprising:
- first and second two-dimensional image sensors;
- an optical system operative to image the same portion of the surface of the vehicle windshield onto said first and second image sensors; and
- a processing circuit in communication with said image sensors and operative to analyze images from said image sensors to detect moisture on the windshield and to activate the windshield wipers when moisture is detected, wherein said processing circuit is configured to compare the relative position of objects in an image from said first image sensor with the relative position of objects in an image from said second image sensor to distinguish objects on the surface from far field objects.

22. The system of claim 21, wherein said first and second image sensors are two adjacent portions of the same image sensor device.

23. The system of claim 21, wherein said first and second image sensors are portions of two separate image sensor devices.

24. The system of claim 21 and further including a rearview mirror assembly, wherein said image sensor arrays are supported on said rearview mirror assembly.

25. The system of claim 21 and further including a rearview mirror assembly, wherein at least a portion of said processing circuit is supported on said rearview mirror assembly.

26. A windshield wiper control system for a vehicle comprising:
- first and second two-dimensional image sensors;
- an optical system operative to image the same portion of the surface of the vehicle windshield onto said first and second image sensors; and
- a processing circuit in communication with said image sensors and operative to analyze images from said image sensors to detect moisture on the windshield and to activate the windshield wipers when moisture is detected, wherein said processing circuit is configured to digitize and subtract the images from said first and second image sensors to distinguish objects on the surface from far field objects.

* * * * *